(12) United States Patent
Liu et al.

(10) Patent No.: US 11,063,253 B2
(45) Date of Patent: Jul. 13, 2021

(54) COMPOSITE PARTICLE FOR ELECTRODE

(71) Applicant: NATIONAL CHENG KUNG UNIVERSITY, Tainan (TW)

(72) Inventors: Chuan Pu Liu, Tainan (TW); Yin Wei Cheng, Kaohsiung (TW); Shih An Wang, Taipei (TW); Bo Liang Peng, Kaohsiung (TW); Chun Hung Chen, New Taipei (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 45 days.

(21) Appl. No.: 16/206,812

(22) Filed: Nov. 30, 2018

(65) Prior Publication Data
US 2020/0176761 A1    Jun. 4, 2020

(51) Int. Cl.
```
H01M 4/36      (2006.01)
H01M 4/38      (2006.01)
H01M 4/1393    (2010.01)
H01M 4/583     (2010.01)
H01M 4/133     (2010.01)
H01M 4/485     (2010.01)
H01M 4/134     (2010.01)
H01M 4/1395    (2010.01)
H01M 4/62      (2006.01)
H01M 4/02      (2006.01)
```
(52) U.S. Cl.
CPC .......... *H01M 4/366* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/485* (2013.01); *H01M 4/583* (2013.01); *H01M 4/625* (2013.01); *H01M 2004/027* (2013.01)

(58) Field of Classification Search
CPC .... H01M 4/1393; H01M 4/583; H01M 4/133; H01M 4/134; H01M 4/1395; H01M 4/625

See application file for complete search history.

(56) References Cited

U.S. PATENT DOCUMENTS

| | | | |
|---|---|---|---|
| 9,985,279 B2 | 5/2018 | Kim et al. | |
| 2005/0136330 A1 | 6/2005 | Mao et al. | |
| 2006/0068287 A1 | 3/2006 | Morita et al. | |
| 2017/0047580 A1* | 2/2017 | Cho | H01M 4/38 |
| 2017/0288211 A1* | 10/2017 | Zhamu | H01M 4/366 |
| 2018/0013137 A1 | 1/2018 | Put et al. | |

FOREIGN PATENT DOCUMENTS

| | | |
|---|---|---|
| CN | 102709566 A | 10/2012 |
| CN | 105826533 A | 8/2016 |
| CN | 105981206 A | 9/2016 |
| CN | 107112504 A | 8/2017 |
| CN | 108390028 A | 8/2018 |
| JP | 20180113187 A | 7/2018 |

* cited by examiner

*Primary Examiner* — Ladan Mohaddes
(74) *Attorney, Agent, or Firm* — CKC & Partners Co., LLC

(57) ABSTRACT

A composite particle for electrode includes a carbon matrix, a plurality of active nanoparticles and a plurality of graphite particles. The active nanoparticles are randomly dispersed in the carbon matrix. Each of the active nanoparticles includes an active material and a protective layer. The protective layer covers the active material, and the protective layer is an oxide, a carbide or a nitride of the active material. The graphite particles are randomly dispersed in the carbon matrix. A volume fraction of the protective layer in each of the active nanoparticles is smaller than 23.0%.

11 Claims, 2 Drawing Sheets

COMPOSITE PARTICLE FOR ELECTRODE

BACKGROUND

1. Technical Field

This present disclosure relates to a composite particle, a battery electrode including the composite particle and a battery with its negative electrode including the composite particle.

2. Related Art

Recently, rechargeable batteries have been applied in various technical fields. For example, lithium batteries have been widely used in electronic devices, vehicles, national defense, military and aerospace fields. Taking the lithium battery as an example, generally, the negative electrode of the lithium battery is made of graphite. However, due to a low capacity of graphite, a high capacity material and a composite of high capacity material and graphite have been developed to be used as negative electrode material.

The high capacity material can be silicon or metal oxide. However, the silicon and metal oxide easily expand during the charging and discharging process, which causes disintegration of the electrode structure. After several cycles of charging and discharging, the capacity of rechargeable battery will be greatly reduced. In order to extend the lifespan of rechargeable batteries, some manufacturers try to reduce the amount of high capacity material in the electrode, but the reduction of high capacity material is unfavorable for the improvement of capacity.

SUMMARY

According to one aspect of the present disclosure, a composite particle for electrode includes a carbon matrix, a plurality of active nanoparticles and a plurality of graphite particles. The active nanoparticles are randomly dispersed in the carbon matrix. Each of the active nanoparticles includes an active material and a protective layer. The protective layer covers the active material, and the protective layer is an oxide, a carbide or a nitride of the active material. The graphite particles are randomly dispersed in the carbon matrix. A volume fraction of the protective layer in each of the active nanoparticles is smaller than 23.0%.

According to another aspect of the present disclosure, a battery electrode includes the aforementioned composite particle.

According to still another aspect of the present disclosure, a rechargeable battery includes a negative electrode including the aforementioned composite particle, a positive electrode, and a separator disposed between the negative electrode and the positive electrode.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
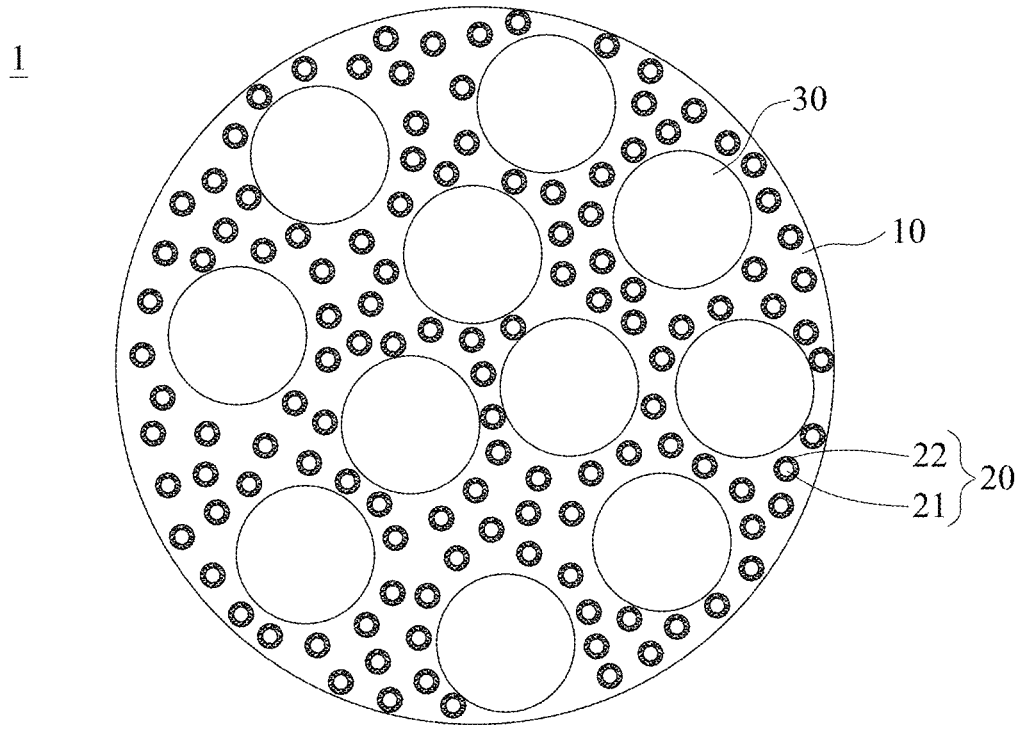
FIG. 1 is a schematic view of a composite particle for electrode according to one embodiment of the present disclosure.

Please refer to FIG. 1, which is a schematic view of a composite particle for electrode according to one embodiment of the present disclosure. In this embodiment, a composite particle 1 for electrode includes a carbon matrix 10, a plurality of active nanoparticles 20 and a plurality of graphite particles 30. The active nanoparticles 20 are randomly dispersed in the carbon matrix 10, and each of the active nanoparticles 20 includes an active material 21 and a protective layer 22. The protective layer 22 covers the active material 21. The protective layer 22 is an oxide, a carbide or a nitride of the active material 21. The graphite particles 30 are randomly dispersed in the carbon matrix 10.

According to one embodiment of the present disclosure, the carbon matrix 10, for example but not limited to, is amorphous carbon matrix or amorphous carbon nitride matrix. The active nanoparticle 20, for example but not limited to, is a nanoparticle including group WA elements or transition elements.

According to one embodiment of the present disclosure, the volume fraction of the protective layer 22 in each active nanoparticle 20 is smaller than 23.0%. More specifically, when the volume of a single active nanoparticle 20 is Vo, the volume of the protective layer 22 of the single active nanoparticle 20 is V, and the volume fraction V/Vo is smaller than 23.0%. Therefore, when the active material 21 expands in a charging reaction, the protective layer 22 is provided as a buffer to prevent cracks of the composite particle 1 due to a compressive force between the expanded active material 21 and the carbon matrix 10. Also, since the volume fraction of the protective layer 22 in the active nanoparticle 20 is within a proper range, it is favorable for preventing high electrical resistance and low capacity (charge/discharge capacity) of the composite particle 1 due to overly thick protective layer 22, thereby meeting the requirements of high capacity and crack resistant structure. Preferably, in some embodiments, the volume fraction of the protective layer in each active nanoparticle is smaller than 10.0%.

According to one embodiment of the present disclosure, an average particle size of the composite particle 1 is from 500.0 nanometers (nm) to 40.0 micrometers (μm). Therefore, an electrode plate made of multiple composite particles 1 features high compaction density, high structural strength and high coulombic efficiency, such that it is favorable for increasing the lifespan of a battery including the electrode plate. A composite particle with an average particle size smaller than 500.0 nm has overly high specific surface area so as to cause the decrease of coulombic efficiency. An electrode plate made of multiple composite particles with an average particle size larger than 40.0 µm has insufficient structural strength such that the lifespan of the battery will decay rapidly. Preferably, in some embodiments, average particle size of the composite particle 1 is from 500.0 nm to 30.0 µm.

According to one embodiment of the present disclosure, an average particle size of each of the active nanoparticles 20 is from 1.0 nm to 500.0 nm. Therefore, it is favorable for balancing the requirements of crack resistant structure and high capacity.

According to one embodiment of the present disclosure, an average particle size of each of the graphite particles 30 is from 300.0 nm to 30.0 µm. Therefore, it is favorable for the graphite particle 30 having a specific surface area which is suitable for providing high electric conductivity. It is also favorable for preventing improper volume of the composite particle 1 due to overly large graphite particles 30.

According to one embodiment of the present disclosure, a thickness of the protective layer 22 in each active nanoparticle 20 is equal to or smaller than 10.0 nm. Therefore, it is favorable for preventing high resistance and low capacity of the composite particle 1 due to overly thick protective layer 22, thereby meeting the requirements of high capacity and crack resistant structure.

According to one embodiment of the present disclosure, the active material 21 of the active nanoparticle 20 is selected from the group consisting of group IVA elements, silver (Ag), zinc (Zn), aluminum (Al), arsenic (As) ˋ iron (Fe), cobalt (Co) ˋ nickel (Ni), copper (Cu), their metallic compounds, their alloys and combination thereof. Therefore, it is favorable for providing high capacity of the battery.

According to one embodiment of the present disclosure, the carbon matrix 10 contacts each of the active nanoparticles 20, and there is no gap between the carbon matrix 10 and the active nanoparticle 20. Therefore, without any gap between the carbon matrix 10 and the active nanoparticle 20, it is favorable for accommodating more active nanoparticles 20 in per unit volume of the composite particle 1, thereby enhancing the capacity.

According to one embodiment of the present disclosure, in each active nanoparticle 20, the protective layer 22 contacts the active material 21, and there is no gap between the active material 21 and the protective layer 22. Therefore, without any gap between the active material 21 and the protective layer 22 in each active nanoparticle 20, it is favorable for obtaining good electric charge transport path between the active material 21 and the carbon matrix 10.

Figure 2:
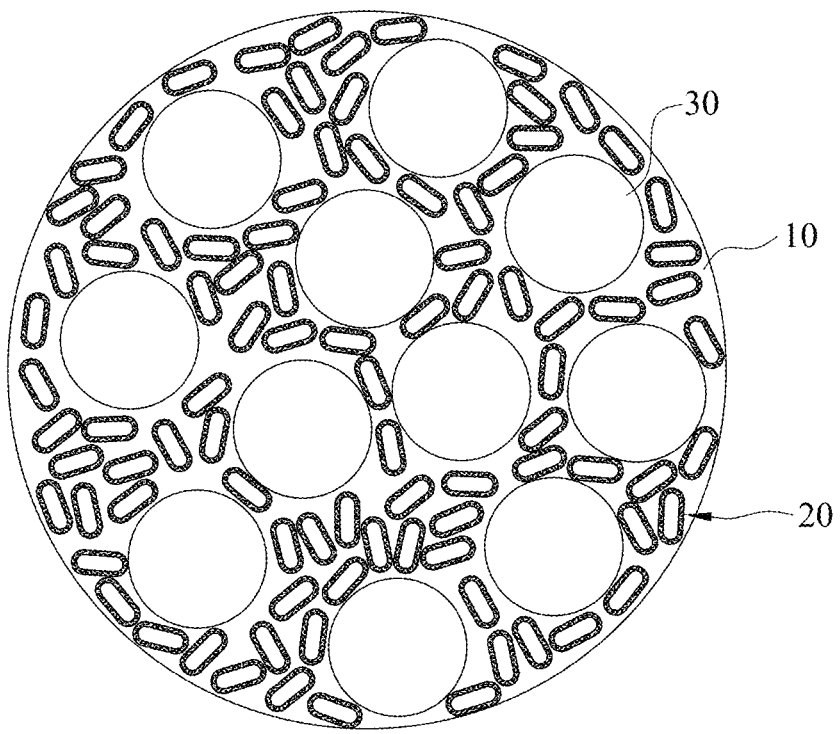
FIG. 2 is a schematic view of a composite particle for electrode according to another embodiment of the present disclosure.

According to one embodiment of the present disclosure, each of the active nanoparticles 20 is in a shape of sphere. Therefore, it is favorable for homogenizing the volume change of the composite particle 1, such that a uniform electrochemical property in per unit volume of the electrode plate made of the composite particles 1 is achieved. A spherical active nanoparticle 20 is shown in FIG. 1, but the present disclosure is not limited thereto. Please refer to FIG. 2, which is a schematic view of a composite particle for electrode according to another embodiment of the present disclosure, wherein the active nanoparticle 20 is in a shape of bar or sheet.

According to one embodiment of the present disclosure, a volume ratio of the active nanoparticles 20 to a total of the carbon matrix 10 and the graphite particles 30 (a ratio of the volume of the active nanoparticles 20 to the sum of volumes of the carbon matrix 10 and the graphite particles 30) is from 1:9 to 9:1. More specifically, when the volume of all active nanoparticles 20 in the composite particle 1 is V1, the volume of the carbon matrix 10 is V2, the volume of all graphite particles 30 in the composite particle 1 is V3, and V1:(V2+V3) is from 1:9 to 9:1. Therefore, it is favorable for the composite particle 1 having high capacity.

According to one embodiment of the present disclosure, the volume of the graphite particle 30 is larger than the volume of the active nanoparticle 20. Therefore, it is favorable for reducing the influence of volume change of the active nanoparticles on the structure of the composite particle 1.

Figure 3:
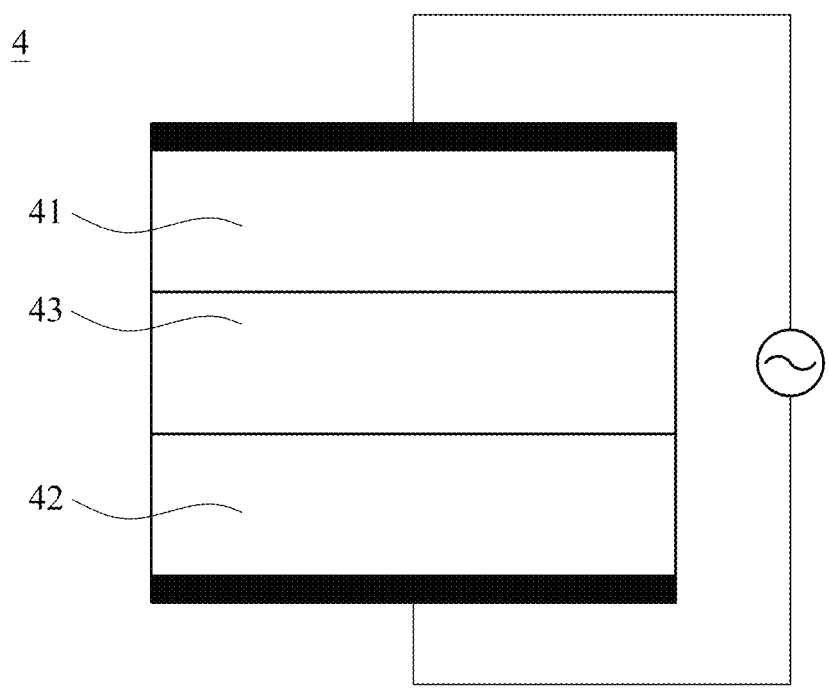
FIG. 3 is a schematic view of a rechargeable battery according to one embodiment of the present disclosure.

The composite particle 1 is applicable to a battery electrode. Please refer to FIG. 3, which is a schematic view of a rechargeable battery according to one embodiment of the present disclosure. The rechargeable battery 4, for example but not limited to, is a lithium-ion battery including a negative electrode 41, a positive electrode 42 and a separator 43. The negative electrode 41 includes multiple composite particles 1. The negative electrode 41 is electrically connected with the positive electrode 42 via one or more current collectors. The separator 43 is disposed between the negative electrode 41 and the positive electrode 42. The separator 43, for example but not limited to, is a polyethylene film, a polypropylene film, an alumina film, a silicon dioxide film, a titanium dioxide film, a calcium carbonate film or a solid electrolyte. In some embodiments, an electrolyte is existed between the negative electrode 41 and the positive electrode 42.

Figure 4:
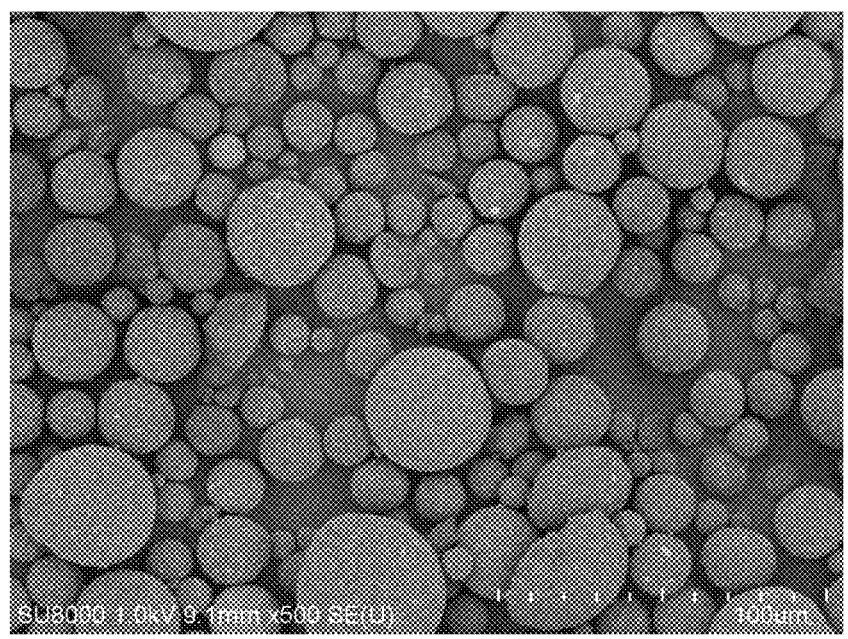
FIG. 4 is a SEM image of the composite particle for electrode according to one embodiment of the present disclosure.

According to one embodiment of the present disclosure, a method of manufacturing composite particle is disclosed. First, several amount of silicon nanoparticle powder is mixed with an aqueous solution (for example, Milli-Q water), and several amount of carboxymethyl cellulose (CMC) is added. The mixture is stirred to make the substances uniformly distributed. Then, several amount of graphite powder is further added, and the stirring is continued until the silicon nanoparticle powder, the CMC and the graphite powder are uniformly dispersed in the aqueous solution to obtain a composite material mixture. The above composite material mixture is granulated by spray granulation, and the granulated particles have a particle size from 500.0 nm to 40.0 µm. The granulated particles are placed in a high temperature furnace continuously supplied with inert gas. The granulated particles are continuously heated for several hours at a temperature of 700° C. to 1000° C. to form composite particles. FIG. 4 is a SEM image of the composite particle for electrode according to one embodiment of the present disclosure.

Another embodiment of the present disclosure discloses a method of manufacturing composite particle. First, several amount of silicon nanoparticle powder is mixed with N-Methyl-2-Pyrrolidone (NMP) solution, and several amount of polyimide is added. The mixture is stirred to make the substances uniformly distributed. Then, several amount of graphite powder is further added, and the stirring is continued until the silicon nanoparticle powder, the polyimide and the graphite powder are uniformly dispersed in the NMP solution to obtain a composite material mixture. The above composite material mixture is granulated by spray granulation, and the granulated particles have a particle size from 500.0 nm to 40.0 µm. The granulated particles are placed in a high temperature furnace continuously supplied with inert gas. The granulated particles are continuously heated for several hours at a temperature of 700° C. to 1000° C. to form composite particles.

According to the above description of the present disclosure, the following specific embodiments are provided for further explanation.

{Influence of Silicon in the Composite Particle on Capacity}

1st Embodiment

A composite particle, manufactured by any one of the aforementioned methods, has an average particle size of 38.0 μm. The composite particle includes a carbon matrix, multiple active nanoparticles with an average particle size of 500.0 nm, and multiple graphitic particles with an average particle size of 2.0 The active nanoparticle includes a silicon core (active material) and a silicon oxide film (protective layer) covering the silicon core. The active nanoparticle is in a shape of sphere. The volume ratio of the active nanoparticles to a total of the carbon matrix and the graphite particles is 1:9.

2nd Embodiment

A composite particle, manufactured by any one of the aforementioned methods, has an average particle size of 25.0 The composite particle includes a carbon matrix, multiple active nanoparticles with an average particle size of 200.0 nm, and multiple graphitic particles with an average particle size of 650 nm. The active nanoparticle includes a silicon core (active material) and a silicon oxide film (protective layer) covering the silicon core. The active nanoparticle is in a shape of sphere. The volume ratio of the active nanoparticles to a total of the carbon matrix and the graphite particles is 1:1.

3rd Embodiment

A composite particle, manufactured by any one of the aforementioned methods, has an average particle size of 20.0 The composite particle includes a carbon matrix, multiple active nanoparticles with an average particle size of 200.0 nm, and multiple graphitic particles with an average particle size of 350 nm. The active nanoparticle includes a silicon core (active material) and a silicon oxide film (protective layer) covering the silicon core. The active nanoparticle is in a shape of sphere. The volume ratio of the active nanoparticles to a total of the carbon matrix and the graphite particles is 9:1.

For a rechargeable battery including the composite particles in each of the 1st embodiment through the 3rd embodiment, after several cycles of charging and discharging under the same current density, the electrochemical properties are shown in TABLE 1 below.

TABLE 1

|  | 1st embodiment | 2nd embodiment | 3rd embodiment |
|---|---|---|---|
| Volume ratio of active nanoparticles to a total of carbon matrix and graphite particles | 1:9 | 1:1 | 9:1 |
| Capacity at 1 C discharge rate (mAh/g) | 520 | 1210 | 1912 |
| Coulombic efficiency (%) | 90.8 | 87 | 82 |
| Capacity retention after 200 cycles (%) | 95 | 90 | 83 |

According to TABLE 1, the composite particles in the 1st embodiment through the 3rd embodiment have the advantages of high capacity, high coulombic efficiency and high cycle life. In addition, the composite particle in the 3rd embodiment, with higher content of silicon, has higher capacity. Furthermore, the protective layer of the active nanoparticle is taken as a buffer to prevent cracks of the active nanoparticle due to excessive expansion of the silicon core. Therefore, compared with the conventional electrode material with high content of silicon, the composite particle in the 3rd embodiment shows high coulombic efficiency and high cycle life.

{Influence of the Volume Fraction of Protective Layer in Active Nanoparticle on Capacity}

4th Embodiment

A composite particle, manufactured by any one of the aforementioned methods, has an average particle size of 30.0 The composite particle includes a carbon matrix, multiple active nanoparticles with an average particle size of 700.0 nm, and multiple graphitic particles with an average particle size of 1.0 The active nanoparticle includes a silicon core (active material) and a silicon oxide film (protective layer) covering the silicon core. The active nanoparticle is in a shape of sphere, and the thickness of the silicon oxide film is 30.0 nm. The volume ratio of the active nanoparticles to a total of the carbon matrix and the graphite particles is 9:1.

5th Embodiment

A composite particle, manufactured by any one of the aforementioned methods, has an average particle size of 30.0 The composite particle includes a carbon matrix, multiple active nanoparticles with an average particle size of 700.0 nm, and multiple graphitic particles with an average particle size of 1.0 The active nanoparticle includes a silicon core (active material) and a silicon nitride film (protective layer) covering the silicon core. The active nanoparticle is in a shape of sphere, and the thickness of the silicon nitride film is 30.0 nm. The volume ratio of the active nanoparticles to a total of the carbon matrix and the graphite particles is 9:1.

6th Embodiment

A composite particle, manufactured by any one of the aforementioned methods, has an average particle size of 25.0 The composite particle includes a carbon matrix, multiple active nanoparticles with an average particle size of 250.0 nm, and multiple graphitic particles with an average particle size of 800.0 nm. The active nanoparticle includes a silicon core (active material) and a silicon oxide film (protective layer) covering the silicon core. The active nanoparticle is in a shape of sphere, and the thickness of the silicon oxide film is 10.0 nm. The volume ratio of the active nanoparticles to a total of the carbon matrix and the graphite particles is 9:1.

7th Embodiment

A composite particle, manufactured by any one of the aforementioned methods, has an average particle size of 25.0 The composite particle includes a carbon matrix, multiple active nanoparticles with an average particle size of 250.0 nm, and multiple graphitic particles with an average particle size of 800.0 nm. The active nanoparticle includes a silicon core (active material) and a silicon nitride film (protective layer) covering the silicon core. The active nanoparticle is in a shape of sphere, and the thickness of the silicon nitride film is 10.0 nm. The volume ratio of the active nanoparticles to a total of the carbon matrix and the graphite particles is 9:1.

For a rechargeable battery including the composite particles in each of the 4th embodiment through the 7th embodiment, after several cycles of charging and discharging under the same current density, the electrochemical properties are shown in TABLE 2 below.

TABLE 2

|  | 4th embodiment | 5th embodiment | 6th embodiment | 7th embodiment |
|---|---|---|---|---|
| Material of protective layer | Silicon oxide | Silicon nitride | Silicon oxide | Silicon nitride |
| Volume fraction of protective layer in active nanoparticle (%) | 23 | 23 | 10 | 10 |
| Capacity at 1 C discharge rate (mAh/g) | 1760 | 1850 | 2500 | 2570 |
| Coulombic efficiency (%) | 71 | 73 | 84 | 85 |

According to TABLE 2, the composite particles in the 4th embodiment through the 7th embodiment have the advantages of high capacity and high coulombic efficiency. In addition, the composite particles in the 6th embodiment and the 7th embodiment, with smaller volume fraction of the protective layer in the active nanoparticle, show a capacity and a coulombic efficiency higher than the composite particles in the 4th embodiment and the 5th embodiment.

{Influence of the Shape of Active Nanoparticle on Capacity}

8th Embodiment

A composite particle, manufactured by any one of the aforementioned methods, has an average particle size of 20.0 μm. The composite particle includes a carbon matrix, multiple active nanoparticles with an average particle size of 200.0 nm, and multiple graphitic particles with an average particle size of 350.0 nm. The active nanoparticle includes a silicon core (active material) and a silicon oxide film (protective layer) covering the silicon core. The active nanoparticle is in a shape of sphere.

9th Embodiment

A composite particle, manufactured by any one of the aforementioned methods, has an average particle size of 20.0 μm. The composite particle includes a carbon matrix, multiple active nanoparticles with an average particle size of 200.0 nm, and multiple graphitic particles with an average particle size of 350.0 nm. The active nanoparticle includes a silicon core (active material) and a silicon oxide film (protective layer) covering the silicon core. The active nanoparticle is in a shape of sheet.

For a rechargeable battery including the composite particles in each of the 8th embodiment and the 9th embodiment, after several cycles of charging and discharging under the same current density, the electrochemical properties are shown in TABLE 3 below.

TABLE 3

|  | 8th embodiment | 9th embodiment |
|---|---|---|
| Shape of active nanoparticle | Sphere | Sheet |
| Capacity at 1 C discharge rate (mAh/g) | 2570 | 2490 |
| Coulombic efficiency (%) | 85 | 82 |

According to TABLE 3, the composite particle in the 8th embodiment shows higher capacity and higher coulombic efficiency than the composite particle in the 9th embodiment.

According to the present disclosure, when the active nanoparticles expand during a charging reaction, the protective layer is provided as a buffer to prevent cracks of the composite particle due to a compressive force between the expanded active nanoparticles and the surrounding carbon matrix. Furthermore, since the volume fraction of the protective layer in the active nanoparticle is within a proper range, it is favorable for preventing high electrical resistance and low charge/discharge capacity of the composite particle 1 due to overly thick protective layer, thereby meeting the requirements of high capacity and crack resistant structure.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A composite particle for electrode, comprising:
    a carbon matrix;
    a plurality of active nanoparticles randomly dispersed in the carbon matrix, each of the plurality of active nanoparticles comprising an active material and a protective layer, the protective layer covering the active material, wherein the protective layer is an oxide, a carbide or a nitride of the active material; and
    a plurality of graphite particles randomly dispersed in the carbon matrix;
    wherein a volume of all the active nanoparticles is V1, a volume of the carbon matrix is V2, and a volume of all the graphite particles is V3, the volume ratio is determined as V1:(V2+V3), and the volume ratio is 1:9 to 9:1, and a volume fraction of the protective layer in each of the plurality of active nanoparticles is equal to 10.0%.

2. The composite particle according to claim 1, wherein an average particle size of the composite particle is from 500.0 nanometers (nm) to 40.0 micrometers (μm).

3. The composite particle according to claim 1, wherein an average particle size of each of the plurality of active nanoparticles is from 1.0 nm to 500.0 nm.

4. The composite particle according to claim 1, wherein an average particle size of each of the plurality of graphite particles is from 300.0 nm to 30.0 μm.

5. The composite particle according to claim 1, wherein a thickness of the protective layer is equal to or smaller than 10.0 nm.

6. The composite particle according to claim 1, wherein the active material is selected from the group consisting of group IVA elements, silver (Ag), zinc (Zn), aluminum (Al), arsenic (As), iron (Fe), cobalt (Co), nickel (Ni), copper (Cu), their metallic compounds, their alloys and combination thereof.

7. The composite particle according to claim 1, wherein the plurality of active nanoparticles contact the carbon matrix without any gap therebetween.

8. The composite particle according to claim 1, wherein the protective layer contacts the active material without any gap therebetween.

9. The composite particle according to claim 1, wherein each of the plurality of active nanoparticles is in a shape of sphere.

10. A battery electrode, comprising the composite particle according to claim 1.

11. A rechargeable battery, comprising:
a negative electrode comprising the composite particle according to claim 1;
a positive electrode; and
a separator disposed between the negative electrode and the positive electrode.

* * * * *